US012762164B2

(12) United States Patent
Yoon et al.

(10) Patent No.: US 12,762,164 B2
(45) Date of Patent: Oct. 13, 2026

(54) COMPUTING TOOL RETRIEVAL USING SEQUENCE PROCESSING MODELS

(71) Applicant: Google LLC, Mountain View, CA (US)

(72) Inventors: Jinsung Yoon, Sunnyvale, CA (US); Yanfei Chen, Pittsburgh, PA (US); Chen-Yu Lee, Cupertino, CA (US); Qingze Wang, San Jose, CA (US); Mohammad Hossein Bateni, Gillette, NJ (US); Vincent Cohen-Addad, Grenoble (FR); Devendra Singh Sachan, London (GB)

(73) Assignee: GOOGLE LLC, Mountain View, CA (US)

( * ) Notice: Subject to any disclaimer, the term of this patent is extended or adjusted under 35 U.S.C. 154(b) by 264 days.

(21) Appl. No.: 18/444,094

(22) Filed: Feb. 16, 2024

(65) Prior Publication Data

US 2025/0265285 A1 Aug. 21, 2025

(51) Int. Cl.
*G06F 16/3332* (2025.01)
*G06F 16/242* (2019.01)

(52) U.S. Cl.
CPC ...... *G06F 16/3334* (2019.01); *G06F 16/2438* (2019.01)

(58) Field of Classification Search
USPC .......................... 707/713, 736, 769, 999.003
See application file for complete search history.

(56) References Cited

U.S. PATENT DOCUMENTS

| | | | | |
|---|---|---|---|---|
| 11,650,073 | B2 * | 5/2023 | Skupin | G06F 16/335 |
| 12,182,125 | B1 * | 12/2024 | Buniatyan | G06F 16/2455 |
| 12,547,634 | B1 * | 2/2026 | Vouitsis | G06F 16/24578 |
| 2025/0111151 | A1 * | 4/2025 | Huang | G06F 16/33 |
| 2025/0181899 | A1 * | 6/2025 | Ajmera | G06F 16/24 |
| 2025/0190459 | A1 * | 6/2025 | Conway | G06F 16/3329 |
| 2025/0265253 | A1 * | 8/2025 | Deepak | G06F 16/2425 |

OTHER PUBLICATIONS

Annil et al., "PaLM 2 Technical Report.", arXiv:2305.10403v3, Sep. 13, 2023, 93 pages.

(Continued)

*Primary Examiner* — Son T Hoang
(74) *Attorney, Agent, or Firm* — DORITY & MANNING, P.A.

(57) ABSTRACT

A machine-learning system effectively and efficiently identifies computing tools that are relevant to processing a query for a sequence processing model. A system can stores, for each computing tool, data associated with at least one synthetic query generated by a machine-learned sequence processing model based on tool documentation for the computing tools. The system determines a subset of computing tools relevant to a particular user query based on the synthetic query for each of the plurality of computing tools. The system generates at least one prompt including the user query and a processing result from each of the subset of computing tools in response to the user query. The system generates a response to the particular user query based at least in part on an output of at least one machine-learned sequence processing model in response to the at least one prompt.

19 Claims, 15 Drawing Sheets

400

(56) References Cited

OTHER PUBLICATIONS

Brown et al., "Language Models are Few-Shot Learners.", arXiv:2005.14165v4, Jul. 22, 2020, 75 pages.
Cai et al., "Large Language Models as Tool Makers.", arXiv:2305.17126v1, May 26, 2023, 22 pages.
Gao et al., "Precise Zero-Shot Dense Retrieval without Relevance Labels.", arXiv:2212.10496vl, Dec. 20, 2022, 11 pages.
Google, "Bard Can Now Connect to your Google Apps and Services.", Sep. 19, 2023, https://blog.google/products/gemini/google-bard-new-features-update-sept-2023/, retrieved on Feb. 22, 2024, 5 pages.
Google, "Introducing Gemini: Our Largest and Most Capable AI Model.", Dec. 6, 2023, https://blog.google/technology/ai/google-gemini-ai/, retrieved on Feb. 22, 2024, 14 pages.
Hsieh et al., "Tool Documentation Enables Zero-Shot Tool-Usage with Large Language Models.", arXiv:2308.00675v1, Aug. 1, 2023, 23 pages.
Huang et al., "MetaTool Benchmark for Large Language Models: Deciding Whether to Use Tools and Which to Use.", arXiv:2310.03128v4, Jan. 18, 2024, 30 pages.
Jagerman et al., "Query Expansion by Prompting Large Language Models.", arXiv:2305.03653v1, May 5, 2023, 7 pages.
Lewis et al., "PAQ: 65 Million Probably-Asked Questions and What You Can Do With Them.", arXiv:2102.07033v1, Feb. 13, 2021, 16 pages.
Li et al., "API-Bank: A Comprehensive Benchmark for Tool-Augmented LLMs.", arXiv:2304.08244v2, Oct. 25, 2023, 15 pages.
Liu et al., "Query Expansion Using Contextual Clue Sampling with Language Models.", arXiv:2210.07093v1, Oct. 13, 2022, 8 pages.
Liu et al., "Lost in the Middle: How Language Models Use Long Contexts.", arXiv:2307.03172v3, Nov. 20, 2023, 18 pages.
Lu et al., "Chameleon: Plug-and-Play Compositional Reasoning with Large Language Models.", arXiv:2304.09842v3, Oct. 31, 2023, 32 pages.
Mackie et al., "Generative Relevance Feedback with Large Language Models.", arXiv:2304.13157v1, Apr. 25, 2023, 6 pages.
Nogueira et al., "Document Expansion by Query Prediction.", arXiv:1904.08375v2, Sep. 25, 2019, 7 pages.
OpenAI.com, "ChatGPT Plugins.", https://openai.com/blog/chatgpt-plugins, retrieved on Feb. 22, 2024, 21 pages.
OpenAI, "GPT-4 Technical Report.", arXiv:2303.08774v4, Dec. 19, 2023, 100 pages.
Ouyang et al., "Training Language Models to Follow Instructions with Human Feedback.", arXiv:2203.02155v1, Mar. 4, 2022, 68 pages.
Parisi et al., "TALM: Tool Augmented Language Models.", arXiv:2205.12255v1, May 24, 2022, 6 pages.
Patil et al., "Gorilla: Large Language Model Connected with Massive APIs.", arXiv:2305.15334v1, May 24, 2023, 18 pages.
Qin et al., "ToolLLM: Facilitating Large Language Models to Master 16000+ Real-world APIs.", arXiv:2307.16789v2, Oct. 3, 2023, 24 pages.
Schick et al., "Toolformer: Language Models Can Teach Themselves to Use Tools.", arXiv:2302.04761v1, Feb. 9, 2023, 17 pages.
Shen et al., "Large Language Models are Strong Zero-Shot Retriever.", arXiv:2304.14233v2, Aug. 2, 2023, 15 pages.
Tang et al., "ToolAlpaca: Generalized Tool Learning for Language Models with 3000 Simulated Cases.", arXiv:2306.05301v2, Sep. 7, 2023, 19 pages.
Touvron et al., "LLaMA: Open and Efficient Foundation Language Models.", arXiv:2302.13971v1, Feb. 27, 2023, 27 pages.
Wang et al., "Query2doc: Query Expansion with Large Language Models.", arXiv:2303.07678v2, Oct. 11, 2023, 10 pages.
Wei et al., "Finetuned Language Models Are Zero-Shot Learners.", arXiv:2109.01652v5, Feb. 8, 2022, 46 pages.
Xu et al., "On the Tool Manipulation Capability of Open-source Large Language Models.", arXiv:2305.16504v1, May 25, 2023, 25 pages.
Yao et al., "ReAct: Synergizing Reasoning and Acting in Language Models.", arXiv:2210.03629v3, Mar. 10, 2023, 33 pages.
Yuan et al., "Craft: Customizing LLMs by Creating and Retrieving from Specialized Toolsets.", arXiv:2309.17428vl, Sep. 29, 2023, 29 pages.
Zhong et al., "AGIEval: A Human-Centric Benchmark for Evaluating Foundation Models.", arXiv:2304.06364v2, Sep. 18, 2023, 22 pages.
Anonymous, "Improving Zero-Shot Tool Retrieval via Document Expansion using Large Language Models.", 16 pages.

* cited by examiner

COMPUTING TOOL RETRIEVAL USING SEQUENCE PROCESSING MODELS

FIELD

The present disclosure relates generally to machine learning processes and machine-learned devices and systems. More particularly, the present disclosure relates to the integration of computing tools with sequence processing models.

BACKGROUND

Artificial intelligence systems increasingly include large foundational machine-learned models which have the capability to provide a wide range of new product experiences. Recent advancement in sequence processing models, including the capabilities of large language models (LLMs) in reasoning, have led to increasing popularity in designing LLM based autonomous agents to fulfill human tasks using various tools. The integration of computing tools such as search engines, mapping applications, etc. has shown the potential to further unlock the potential of these LLMs. An emergent challenge, however, is how to effectively integrate relevant computing tools from a large collection of available computing tools.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method that includes, by a computing system, storing, for each of a plurality of computing tools, data associated with at least one synthetic query generated by one or more machine-learned sequence processing models based at least in part on tool documentation for said each computing tool, determining a subset of the plurality of computing tools that are relevant to a particular user query based at least in part on the data associated with the at least one synthetic query for each of the plurality of computing tools, and generating at least one prompt for at least one machine-learned sequence processing model. The at least one prompt includes the particular user query and a processing result from each of the subset of the plurality of computing tools in response to the particular user query. The method includes generating a response to the particular user query based at least in part on an output of the at least one machine-learned sequence processing model in response to the at least one prompt.

Another example aspect of the present disclosure is directed to a computer-implemented method that includes, by a computing system, providing, to one or more machine-learned sequence processing models for each of a plurality of computing tools, at least one synthetic query generation request based at least in part on tool documentation associated with said each computing tool, obtaining, from the one or more machine-learned sequence processing models for each of the plurality of computing tools, at least one synthetic query that can be processed by said each computing tool of the plurality of computing tools, storing data associated with the at least one synthetic query for each of the plurality of computing tools, and processing a particular user query for at least one machine-learned sequence processing model based at least in part on the data associated with the at least one synthetic query for each of the plurality of computing tools.

Another example aspect of the present disclosure is directed to a computing system including one or more processors and one or more non-transitory computer-readable media that collectively store instructions that when executed by the one or more processors, cause the one or more processors to perform operations. The operations include storing, for each of a plurality of computing tools, data associated with at least one synthetic query generated by one or more machine-learned sequence processing models based at least in part on tool documentation for said each computing tool, determining a subset of the of the plurality of computing tools that are relevant to a particular user query based at least in part on the data associated with the at least one synthetic query for each of the plurality of computing tools, generating at least one prompt for at least one machine-learned sequence processing model, the at least one prompt including the particular user query and a processing result from each of the subset of the plurality of computing tools in response to the particular user query, and generating a response to the particular user query based at least in part on an output of the at least one machine-learned sequence processing model in response to the at least one prompt.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

DETAILED DESCRIPTION

Figure 1:
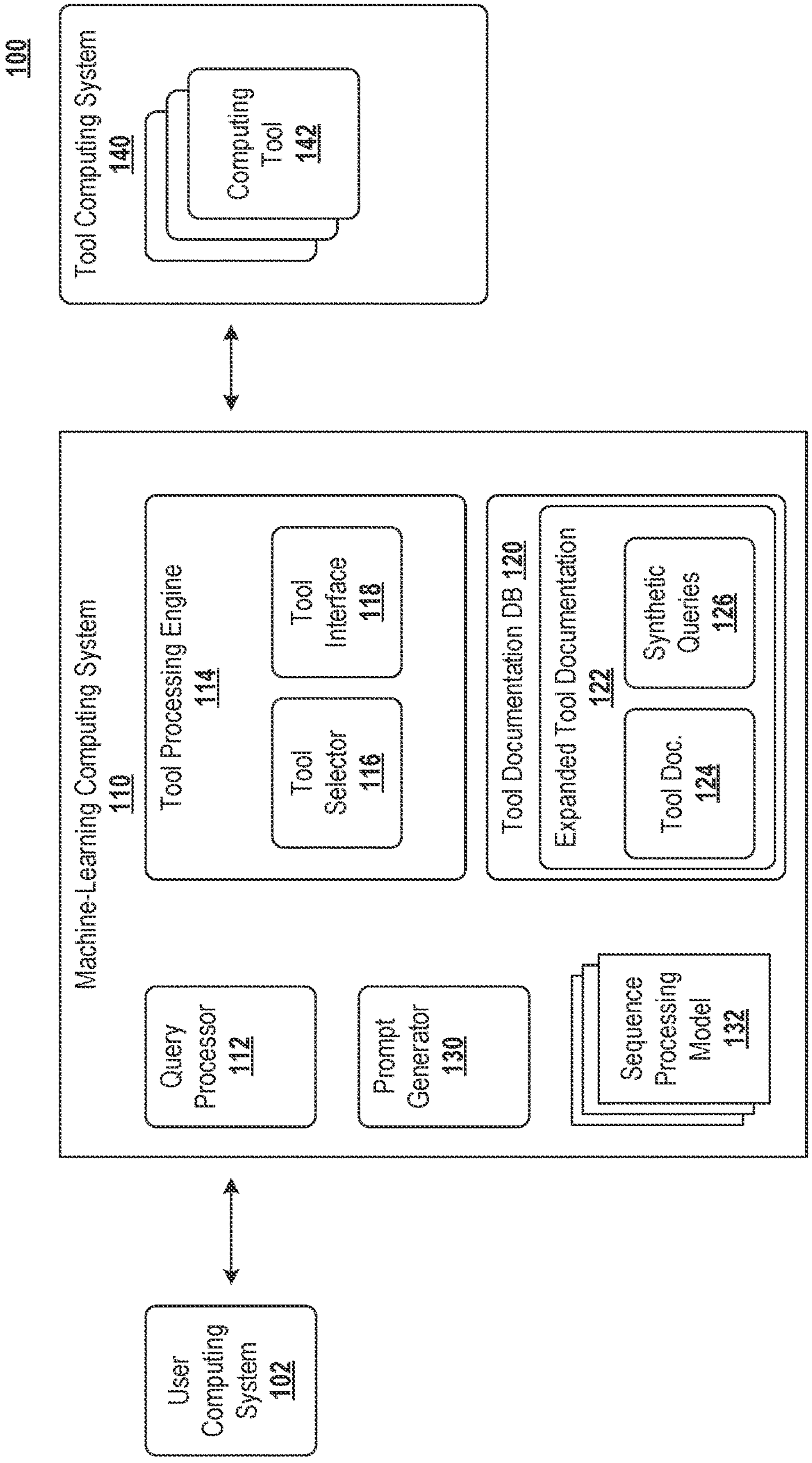
FIG. 1 is a block diagram depicting an example computing environment including a machine-learning system configured to identify and/or retrieve processing results from a subset of relevant computing tools for processing a query for one or more sequence processing models according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, the present disclosure is directed to a machine-learning system that is configured to effectively and efficiently identify from a large collection of computing tools a subset of computing tools that are relevant to processing a query for a sequence processing model. Recent advancements in sequence processing models such as large language models (LLM)'s have led to increased interest in using sequence processing models to fulfill computing tasks using various computing tools. The number of computing tools that are available to these models, however, is increasing, leading to scalability issues when integrating these tools with machine-learning systems. To address this scalability issue, embodiments in accordance with the present disclosure provide for the expansion of tool documentation using sequence processing models and the identification and/or retrieval of processing results from computing tools relative to particular queries.

In accordance with example embodiments of the disclosed technology, computing systems and methods are provided to automatically expand tool documentation using one on or more synthetic queries generated by a sequence processing model based at least in part on the tool documentation. The expanded tool documentation can be stored for use in processing user queries by machine-learned sequence processing models such as large language models. Subsequently, when a particular user query is received for a sequence processing model, the system can identify from a large collection of computing tools, a subset of computing tools that are relevant to the particular user query based on the expanded tool documentation. The system can access the subset of computing tools to generate a processing result based on the particular user query. The processing result can then be provided to the sequence processing model to aid in generating a response to the user query.

Recently, sequence processing models such as large language models have demonstrated impressive capabilities on a large variety of tasks such as math, reasoning, and coding, among others. Sequence processing models, however, are generally trained on a frozen corpus of data which limits their ability to adapt to the rapidly evolving real-world. Fine-tuning these models can be computationally expensive. Instead of relying on frozen internal knowledge, augmenting sequence processing models with external tools has the potential to unleash the potential of sequence processing models in solving even more challenging tasks. Thus, there has been a growing interest in teaching sequence processing models to effectively interact with various external computing tools such as search engines, mapping engines, gaming tools, location services, research services, forecasting services, blockchain services and more.

According to example aspects of the present disclosure, a machine-learning system is provided that can store, for each computing tool of a collection of available computing tools, at least one synthetic query generated by one or more machine-learned sequence processing models based at least in part on tool documentation for each tool. The synthetic queries generated by the model can be queries that can be effectively answered by invoking the corresponding tool. Each synthetic query for a computing tool can be appended to the tool documentation for the computing tool. The expanded tool documentation, including the tool document with the appended query(ies), can be stored in a database or other data store. In some examples, the expanded tool documentation can be encoded in an embedding space. Subsequently, when a user query is received (e.g., during inference), the particular user query can be compared with the expanded tool documentation to identify and/or retrieve a subset of tools that are relevant to the user query. For example, the user query can be encoded in the same embedding space as the tool documentation. A similarity between the user query and the tool documentation embeddings can be used to identify those tools that are be relevant to the particular user query.

In some examples, after identifying a subset of computing tools that are relevant to the user query, the system can provide the user query to each of the subset of computing tools and receive a tool processing result. The system can then prompt a machine-learned sequence processing model with the user query and the processing result from each of the subset of computing tools. The system can generate a response to the user query based at least in part on an output of the machine-learned sequence processing model in response to the prompt.

According to example aspects of the present disclosure, a machine-learning system can generate expanded tool documentation using one or more sequence processing models (e.g., LLMs). For each computing tool of a collection of computing tools, the system can issue at least one synthetic query generation request to the sequence processing model (s). Each synthetic query generation request can include a request to generate at least one synthetic query based at least in part on the tool documentation for the corresponding tool. For example, the system can provide a prompt to the model(s). The prompt can include the tool documentation and a request to generate one or more synthetic queries that can effectively be processed by the corresponding computing tool. In some examples, the system can issue one or more synthetic query generation requests to generate multiple synthetic queries for each tool. The system can vary the temperature or another parameter of the model so that a diverse set of synthetic queries will be generated.

In accordance with example embodiments of the disclosed technology, a machine-learning system can generate, and store data associated with the synthetic queries generated by the sequence processing model(s) in response to the synthetic query generation request for each computing tool. For example, the system can generate expanded tool documentation for a computing tool by augmenting the original tool documentation with data associated with the corresponding synthetic queries. For example, the synthetic queries can be appended to the original tool documentation. The expanded tool documentation can then be stored in a database for online access by the system to process user queries. In another example, the data associated with the synthetic queries can include one or more embeddings of each synthetic query. The system can encode the synthetic queries for each computing tool into an embedding space. The system can encode the expanded tool documentation, for example encoding the original tool documentation with the appended synthetic queries. The embeddings can be stored in an embedding database. When a user query is received, it can be encoded into the same embedding space so that a subset of computing tools can be identified based on the distance between the tool documentation embeddings and the user query embedding.

According to example aspects of the present disclosure, the expanded tool documentation can be used with similarity-based retrieval methods to identify the subset of computing tools that are relevant to a particular user query. By way of example, search techniques such as keyword comparisons between the user query and the expanded tool documentation can be used. In other examples, sparse or dense retrieval methods can be used based on comparing embeddings of the augmented tool documentation and user query. When multiple synthetic queries are generated for a computing tool, similarity scores can be calculated for each synthetic query and the user query. The scores can be aggregated to represent a final similarity score between the user query and the corresponding tool document.

In example implementations, one or more sequence processing models can be used to generate synthetic queries for each computing tool document. The one or more sequence processing models can include a first large language model (LLM). For instance, the responses from the first LLM can include natural language outputs including synthetic user queries that can be effectively processed by the corresponding computing tool. The synthetic queries generated by the first LLM can be used to process actual user queries for the first LLM and/or actual user queries for other sequence processing models. For example, data associated with a synthetic query generated by a first LLM for tool documentation can be used to process actual user queries for the same first LLM or for a second LLM or other model. Much of the following disclosure refers to large language models as specific examples of sequence processing models but it will be appreciated that the disclosure is equally applicable to any type of sequence processing model.

Systems and methods in accordance with example embodiments of the present disclosure provide a number of technical effects and benefits. In particular, the systems and methods can include a computing system that is configured to determine from a large collection of available computing tools, a smaller subset of computing tools that are be relevant to a particular user query. The system can utilize a processing result from the subset of computing tools to assist a sequence processing model such as a large language model with processing the user query. In this manner, the systems and methods can effectively and efficiently identify from a large collection of computing tools a subset of computing tools that are relevant to processing a query for a sequence processing model. By identifying a smaller subset of computing tools relevant to processing a query, the systems and methods overcome limitations associated with techniques that may attempt to augment models with the tool documentation for all available tools.

Traditional approaches to instruct sequence processing models to leverage computing tools usually involve supervision with in-context learning or reinforcement learning. While augmenting sequence processing models with tool documentation for available tools can improve the model's ability to write correct model calls, for example, these approaches may be ineffective. For example, the collection of available computing tools can be large, reaching into the hundreds and thousands. It would be intractable to provide and maintain labels for all the computing tools to train a retriever. Continuous re-training of the retriever as the tool documentation is updated would be prohibitive. Additionally, the input token length for sequence processing models is usually limited explicitly or practically. As such, it is infeasible to include the entire list of tools in a single prompt. Moreover, sequence processing models may not be robust in accessing relevant information in long input contexts.

In accordance with embodiments of the disclosed technology, a machine-learning system is configured to scale the capabilities of large collections of tools by integrating a retrieval system with sequence processing models to identify and/or retrieve a set of relevant tools given a particular user task. Systems and methods in accordance with example embodiments can utilize an unsupervised method that leverages sequence processing models to expand the tool documentation for a collection of computing tools to improve tool retrieval performance given user queries. According to example implementations, labeled datasets are not required and the retrieval process can be integrated with any retrieval system using keyword, sparse, or dense retrieval methods. In this manner, the disclosed technology can easily adapt to any documentation version changes without re-training the retriever. In some cases, the tool documentation is augmented such that re-indexing is not required during online inference to achieve fast retrievals.

In accordance with embodiments of the disclosed technology, synthetic queries can be generated by a machine-learned model to augment tool documents. The augmented tool documents can be used to identify and retrieve a subset of available computing tools. The subset of computing tools, rather than a full collection of available tools, can be used to process online user queries. By leveraging a machine-learned model to augment tool documentation, an effective and efficient use of a large collection of computing tools can be achieved. The system can limit query processing to those tools that are identified as relevant. The processing results of the subset of computing tools can be used to process user queries rather than all available tools. As such, the impracticality of processing a query by every available computing tool is overcome and computing efficiencies relative to such approaches are provided.

With reference now to the Figures, example embodiments of the present disclosure will be discussed in further detail.

Example System Arrangements

FIG. 1 is a block diagram depicting an example computing environment 100 including a machine-learning system configured to effectively and efficiently identify from a large collection of computing tools, a subset of computing tools that are relevant to processing a query for one or more sequence processing models. Computing environment 100 includes a user computing system 102, a machine-learning computing system 110, and a tool computing system 140. Although a single user computing system, machine-learning computing system, and tool computing system are shown, any number of these systems can be included in accordance with embodiments of the present disclosure.

Machine-learning computing system 110 is configured to receive user queries from computing devices such as user computing system 102. Computing system 110 includes a query processor 112, tool processing engine 114, tool documentation database 120, prompt generator 130, and one or more sequence processing models 132. The tool documentation for a particular tool can explain or otherwise include information pertaining to how to use the tool. The tool documentation can be written by human developers of the tool. The user queries can include queries to be processed by the one or more sequence processing models 132 implemented by the machine-learning computing system. In some cases, a user query can be processed with the aid of one or more computing tools 142 hosted or otherwise implemented by tool computing system 140. A user query can represent a user task or instruction(s) for which a machine-learned model is to use its internal knowledge and/or external computing tools to respond to those instructions. A user query can be received as a prompt for an LLM, for example.

Query processor 112 is configured to receive user queries and generate one or more query responses in response to each query. A user query can include text, audio, video or other input modalities. In one specific example, user query includes a natural language input requesting performance of a task by a sequence processing model 132. For instance, a user query can include a natural language input requesting that primary sequence processing model generate an e-mail, edit a picture, write a letter, determine directions to a location, prepare a resume, write computer code, create a recipe, post to a social media application, or one of the other myriad tasks for which sequence processing models can be configured.

In response to a particular user query, query processor can invoke or otherwise communicate with tool processing engine 114 to identify and/or retrieve a subset of computing tools 142 that are relevant to the particular user query. Tool processing engine 114 includes a tool selector 116 configured to obtain the particular user query and determine a similarity between the particular user query and tool documentation stored in tool documentation database 120 for the collection of computing tools.

Tool documentation database 120 stores expanded tool documentation 122 including data indicative of one or more tool documents and one or more synthetic queries for each computing tool 142. For each tool, database 120 can store at least one synthetic query 126 generated by one or more machine-learned sequence processing models based at least in part on tool documentation for each tool. The synthetic queries 126 generated by the model can be queries that can be effectively answered by invoking the corresponding tool. Each synthetic query 126 for a computing tool can be appended to the tool document 124 for the computing tool. The expanded tool documentation 122, including the tool document 124 with the appended query(ies) 126, can be stored in database 120. In some examples, the expanded tool documentation can be encoded in an embedding space such that the data associated with the synthetic queries can include one or more embeddings of each synthetic query. The system can encode the synthetic queries for each computing tool into an embedding space. The system can encode the expanded tool documentation, for example by encoding the original tool documentation with the appended synthetic queries.

Tool selector 116 is configured to compare the particular user query with the expanded tool documentation 122 and identify a subset of computing tools 142 that are relevant to the user query. For example, tool selector 116 can compare the particular user query with the expanded tool documentation to identify and/or retrieve a subset of tools that are relevant to the user query. In example embodiments, tool selector 116 can perform similarity-based retrieval methods such as keyword, sparse, or dense retrieval methods for online inference.

Tool processing engine 114 can include a tool interface 118 that is configured to provide the particular user query to each of the subset of computing tools identified by tool selector 116. Each computing tool 142 can process the particular user query and provide a response to the tool interface 118 including a tool processing result for the user query.

Prompt generator 130 can be configured to generate one or more prompts for sequence processing model(s) based at least in part on the particular user query and the tool processing result(s) received from each of the subset of computing tools 142. Prompt generator 130 can generate a prompt including the particular user query and the tool processing result(s) from each of the subset of computing tools.

Query processor 112 can obtain one or more outputs from the sequence processing model(s) 132 in response to the one or more prompts generated by prompt generator 130. Query processor 112 can generate one or more query responses to the particular user query based at least on the one or more outputs from the sequence processing model 132.

In some examples, machine-learning computing system 110 can be implemented by one or more first computing devices, user computing system 102 can be implemented by one or more second computing devices, and tool computing system 140 can be implemented by one or more third computing devices. For instance, computing environment 100 can be implemented as a client server computing environment, including one or more client computing devices implementing user computing system 102, one or more server computing devices implementing machine-learning computing system 110, and one or more server computing devices implementing tool computing system 140.

User computing system 102, machine-learning computing system 110, and tool computing system 140 can be connected by and communicate through one or more networks (not shown). Any number of client computing devices and/or server computing devices can be included in the client-server environment and communicate over a network. The network can be any type of communications network, such as a local area network (e.g., intranet), wide area network (e.g., Internet), or some combination thereof. In general, communication between the computing devices can be carried via a network interface using any type of wired and/or wireless connection, using a variety of communication protocols (e.g., TCP/IP, HTTP, RTP, RTCP, etc.), encodings or formats (e.g., HTML, XML, etc.), and/or protection schemes (e.g., VPN, secure HTTP, SSL, etc.).

In some example embodiments, a client computing device implementing user computing system 102 can be any suitable device, including, but not limited to, a smartphone, a tablet, a laptop, a desktop computer, or any other computer device that is configured such that it can allow a user to access remote computing devices over a network. The client computing devices can include one or more processor(s), memory, and a display as described in more detail hereinafter. The client computing devices can execute one or more client applications such as a web browser, email application, chat application, video conferencing application, word processing application or the like.

A server computing device implementing machine-learning computing system or and/or tool computing system 140 can include one or more processor(s) and memory implementing the respective computing systems. The server computing system can be in communication with the one or more client computing device(s) using a network communication device that is not pictured.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Figure 2:
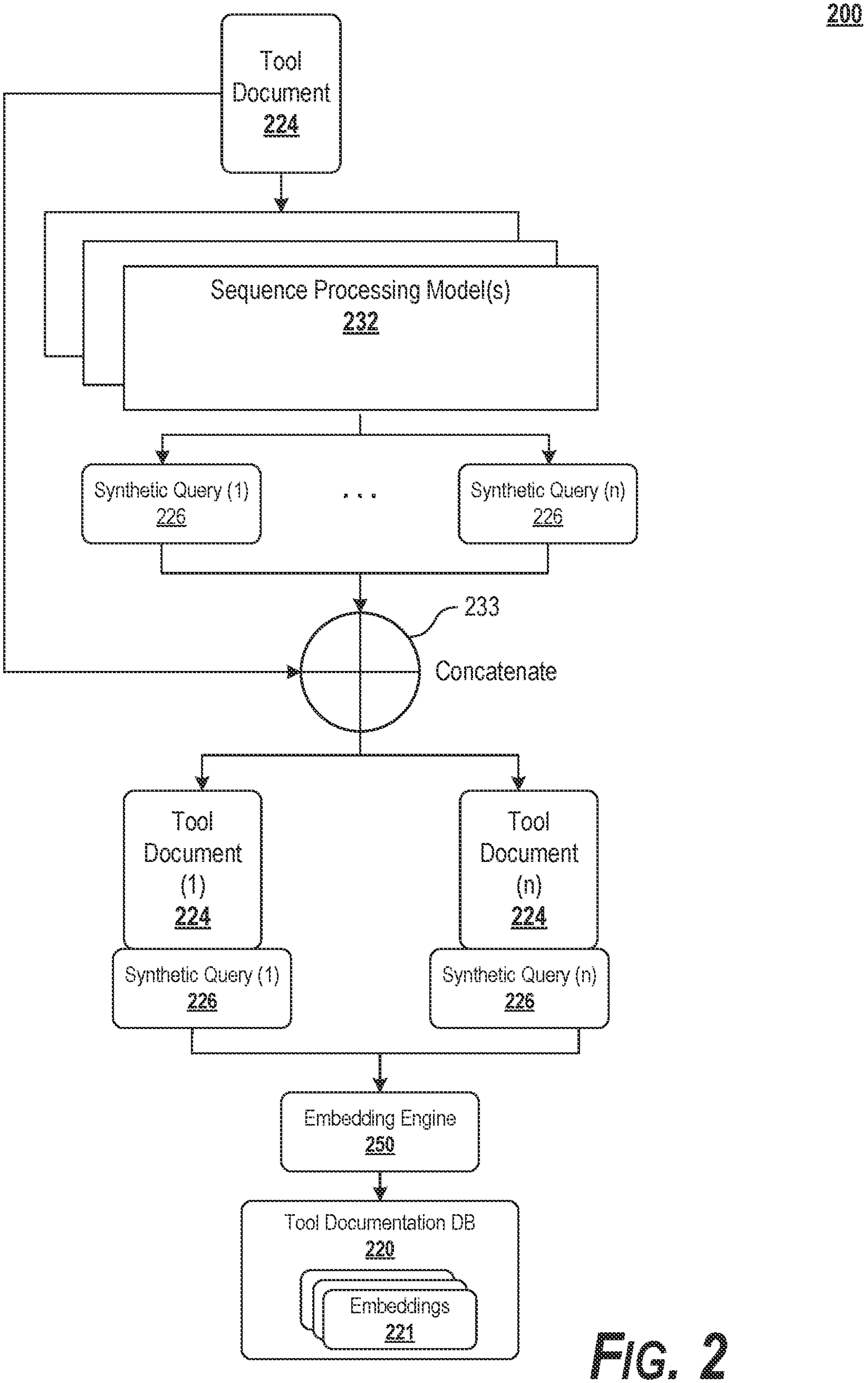
FIG. 2 is a block diagram depicting an example computing environment including a machine-learning system configured to generate a tool documentation database according to example embodiments of the present disclosure.

FIG. 2 is a block diagram depicting an example computing environment 200, illustrating additional details of a machine-learning system configured to generate a tool documentation database 220. Tool documentation database 220 is one example of a tool documentation database 120 as described in FIG. 1. FIG. 2 depicts an example of generating expanded tool documentation for a particular computing tool having or otherwise associated with tool document 224. Tool document 224 can include text data and/or other data indicative of a particular computing tool. Tool document 224, for example, can describe inputs/outputs of the tool, an application programming interface (API) for interacting with the particular computing tool, and/or other information associated with the particular computing tool.

Tool document 224 can be provided as an input to one or more machine-learned sequence processing models. In example embodiments, a sequence processing model 232 can be or otherwise include a large language model (LLM). The machine-learning system can input tool document 224 to a sequence processing model as part of a synthetic query generation request. The synthetic query generation request can include the tool document 224 and a query or other prompt requesting the LLM to generate one or more synthetic user queries based on the tool document. For example, the system can provide a prompt to the model(s) that includes the tool document 224 and a request to generate one or more synthetic queries that can effectively be processed by the corresponding computing tool. By way of example, an example a synthetic query generation request can be structured as follows:

"Suppose you are an assistant and you have access to the following API to answer user's queries. You are provided with a tool and its available API function including the description and parameters.

Your task is to generate a possible user query that can be handled by the API.

You must include the input parameters required in the API call. Please be creative and generate random but specific information for the required parameters. Now you are given the API documentation below:

<tool document>

Please generate a user query that you will need to call this tool. Note the generated query should be complex enough to describe the scenarios that you will need to call the provided API to address them. The relevant query is:"

In some examples, the system can issue one or more synthetic query generation requests to generate multiple synthetic queries for each tool. The system can vary the temperature or other parameters and sample the model multiple times so that a diverse set of synthetic queries will be generated.

Sequence processing model(s) generate one or more synthetic queries 226 in response to the tool document. Any number of synthetic queries 226 can be generated for each computing tool based on a tool document 224. The synthetic queries generated by the model can be queries that can be effectively answered by invoking the corresponding tool.

The system can generate expanded tool documentation for a computing tool by augmenting the original tool documentation with data associated with the corresponding synthetic queries. FIG. 2 illustrates a concatenate 233 function that is performed to append each synthetic query 226 to the original tool document. The synthetic queries are individually appended to or otherwise associated with the original tool documentation.

Each expanded tool document including tool document 224 and synthetic query can be embedded into an embedding space using embedding engine 250. Any suitable embedding method can be used. In some example, an embedding 221 is generated and stored in tool documentation database 220 for each expanded tool document. A machine-learned model including an encoder can be configured to generate embeddings 221 in an example embodiment. The expanded tool documentation can be stored in tool documentation database 220 for online access by the system to process user queries.

Figure 3:
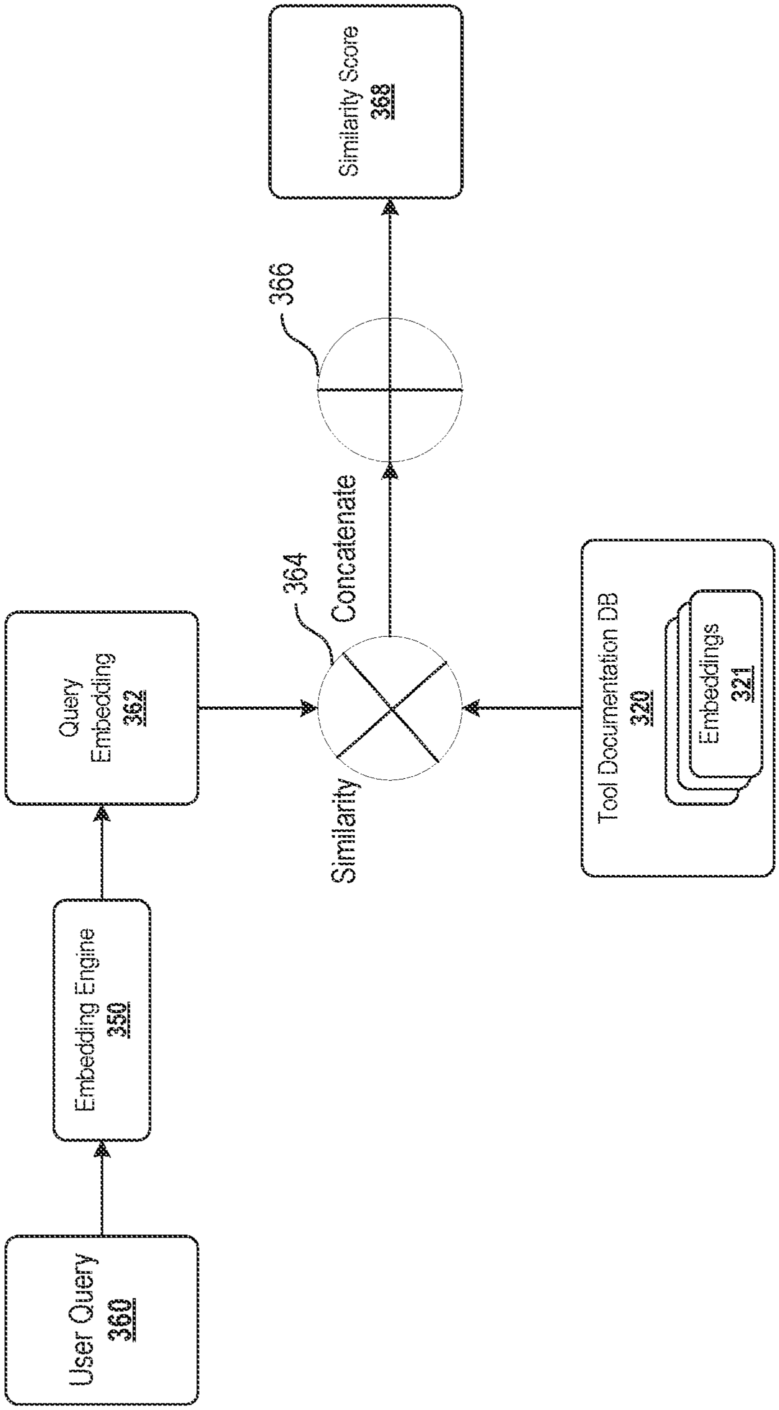
FIG. 3 is a block diagram depicting an example computing environment configured to identify and/or retrieve processing results from a subset of computing tools that are relevant to particular user query according to example embodiments of the present disclosure.

FIG. 3 is a block diagram depicting an example computing environment 300 illustrating additional details of a machine-learning system configured to identify and/or retrieve, from a collection of computing tools, a subset of computing tools that are relevant to particular user query. Example computing environment 300 can be used to implement a machine-learning computing system 110 as depicted in FIG. 1. A user query 360 (e.g, a prompt) is received by a machine-learning system that hosts or otherwise provides access to one or more sequence processing models such as LLMs. In an example embodiment, a user query 360 can be received by a query processor 112 as described in FIG. 1.

The user query can be passed to an embedding engine 350 which generates one or more query embeddings 363 from the user query. Embedding engine 350 can embed the user query into the same embedding space as embeddings 321 in tool documentation database 320. In an example embodiment, embedding engine 350 can be implemented as part of tool selector 116 in FIG. 1.

The query embedding 362 is then compared with embeddings 321 in tool documentation database 220 to identify a subset of computing tools that can be relevant to the user query. In FIG. 3, a similarity 364 function and concatenate 366 function are utilized to generate a similarity score between the user query 360 an each corresponding tool document (e.g., tool document 224). Any similarity-based retrieval method including sparse or dense retrieval methods can be used for online inference. In example embodiments, multiple synthetic queries can be generated for each tool document 224. As such, a final similarity score s for a user query and tool document can be calculated by aggregating the similarity scores calculated for each synthetic query. Equation 1 sets forth an example equation for computing a final similarity score s.

$$\hat{s}(Q, D) = f(s(Q, concat(D, q_i))) \quad \text{Equation 1}$$

In Equation 1, Q is the next user query text, D is the tool document text, $q_i$ is the ith generated query text, n is the number of generated synthetic queries, concat(•) is the string concatenation function, s(•) is a similarity function in the retrieval method, and f(•) is an aggregate function on n generated queries. A mean function, i.e., $$f = \frac{1}{n}\sum_{i=1}^{n}.$$

Other functions can be used.

The expanded tool documentation stored in tool documentation database 320 can be used with any retrieval methods with a ranking or similarity function. Sparse retrieval methods such as BM25 can use a sparse vector to represent the similarity function between the query and the documents. Dense retrieval methods can use a machine-learned embedding model to determine similarity as is commonly used in semantic search to rank text using semantic similarity. In some example, the expanded tool documents including the synthetically generated queries can first be encoded as text embedding values using an embedding model offline. During the online retrieval process, the actual user queries can be encoded into the same embedding space. The system can compute cosine similarity scores between the actual user query text embedding and the expanded document embedding. Any embedding model can be used to compute the similarity scores.

Example Methods

Figure 4:
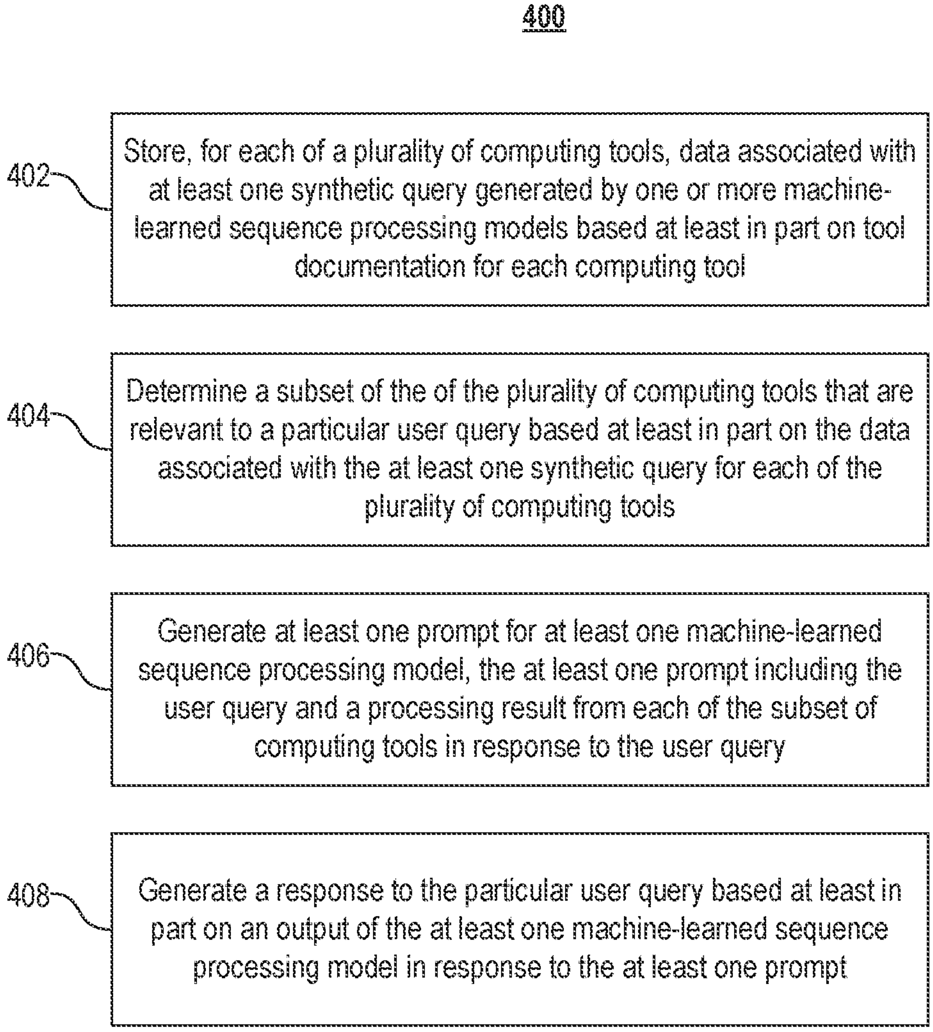
FIG. 4 is a flowchart diagram depicting an example method for processing a user query using expanded tool documentation according to example embodiments of the present disclosure.
Figure 5:
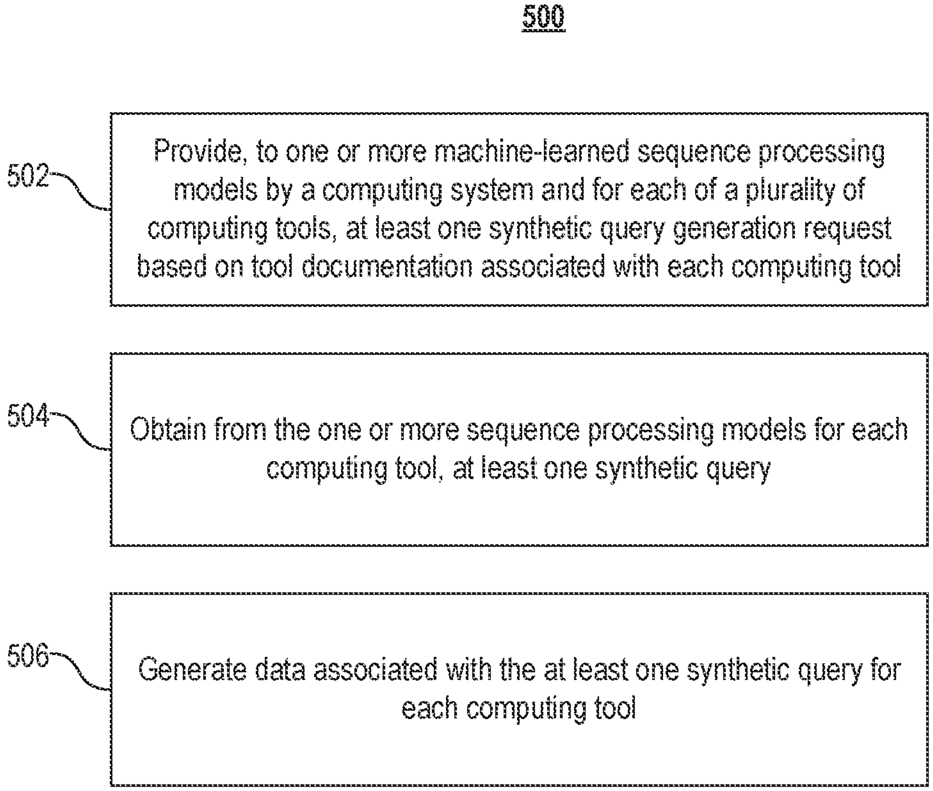
FIG. 5 is a flowchart diagram depicting an example method for generating expanded tool documentation for a collection of computing tools according to example embodiments of the present disclosure.

FIG. 4 is a flowchart depicting a method 400 for processing a particular user query using expanded tool documentation to identify and retrieve processing results for a subset of computing tools to processing the particular user query using one or more sequence processing models. One or more portion(s) of example method 400 (and method 500 described hereinafter) can be implemented by a computing system that includes one or more computing devices such as, for example, a machine-learning computing system as described herein. Each respective portion of example method 400 can be performed by any (or any combination) of one or more computing devices. Moreover, one or more portion(s) of example methods 400 and 500 can be implemented on the hardware components of the device(s) described herein, for example, to train one or more systems or models. FIGS. 4 and 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIGS. 4 and 5 are described with reference to elements/terms described with respect to other systems and figures for exemplary illustrated purposes and is not meant to be limiting. One or more portions of example methods 400 and 500 can be performed additionally, or alternatively, by other systems.

At 402, method 400 can include storing, for each of a plurality of computing tools, data associated with at least one synthetic query generated by one or more machine-learned sequence processing models based at least in part on tool documentation for each computing tool. For example, a machine-learning system can store at least one synthetic query generated by one or more machine-learned sequence processing models based at least in part on tool documentation for each tool. The synthetic queries generated by the model can be queries that can be effectively answered by invoking the corresponding tool. Each synthetic query for a computing tool can be appended to the tool documentation for the computing tool. The expanded tool documentation, including the tool document with the appended query(ies), can be stored in a database or other data store. In some examples, the expanded tool documentation can be encoded in an embedding space.

At 404, method 400 can include, determining a subset of the of the plurality of computing tools that are relevant to a particular user query based at least in part on the data associated with the at least one synthetic query for each of the plurality of computing tools. The particular user query can be compared with the expanded tool documentation to identify and/or retrieve a subset of tools that are relevant to the user query. For example, the user query can be encoded in the same embedding space as the tool documentation. A similarity between the user query and the tool documentation embeddings can be used to identify those tools that are be relevant to the particular user query.

At 406, method 400 can include, generating at least one prompt for at least one machine-learned sequence processing model. The at least one prompt can include the user query and a processing result from each of the subset of computing tools in response to the user query. After identifying a subset of computing tools that are relevant to the user query, the system can provide the user query to each of the subset of computing tools and receive a tool processing result. The system can then prompt the machine-learned sequence processing model with the user query and the processing result from each of the subset of computing tools.

At 408, method 400 can include, generating a response to the particular user query based at least in part on an output of the at least one machine-learned sequence processing model in response to the at least one prompt.

FIG. 5 is a flowchart depicting a method 500 for generating expanded tool documentation for a collection of computing tools.

At 502, method 500 can include providing, to one or more machine-learned sequence processing models for each of a plurality of computing tools, at least one synthetic query generation request based on tool documentation associated with each computing tool. A machine-learning system can generate expanded tool documentation using one or more sequence processing models (e.g., LLMs). For each computing tool of a collection of computing tools, the system can issue at least one synthetic query generation request to the sequence processing model(s). Each synthetic query generation request can include a request to generate at least one synthetic query based at least in part on the tool documentation for the corresponding tool. For example, the system can provide a prompt to the model(s) that includes the tool documentation and a request to generate one or more synthetic queries that can effectively be processed by the corresponding computing tool. In some examples, the system can issue one or more synthetic query generation requests to generate multiple synthetic queries for each tool. The system can vary the temperature or another parameter of the model so that a diverse set of synthetic queries will be generated.

At 504, method 500 can include obtaining from the one or more sequence processing models for each computing tool, at least one synthetic query. At 506, method 500 can include generating data associated with the at least one synthetic query for each computing tool. The system can generate and store data associated with the synthetic queries generated by the sequence processing model(s) in response to the synthetic query generation request for each computing tool. For example, the system can generate expanded tool documentation for a computing tool by augmenting the original tool documentation with data associated with the corresponding synthetic queries. The synthetic queries can be appended to the original tool documentation. The expanded tool documentation can then be stored in a database for online access by the system to process user queries. In another example, the data associated with the synthetic queries can include one or more embeddings of each synthetic query. The system can encode the synthetic queries for each computing tool into an embedding space. The system can encode the expanded tool documentation, for example encoding the original tool documentation with the appended synthetic queries. The embeddings can be stored in an embedding database. When a user query is received, it can be encoded into the same embedding space so that a subset of computing tools can be identified based on the distance between the tool documentation embeddings and the user query embedding.

Figure 6:
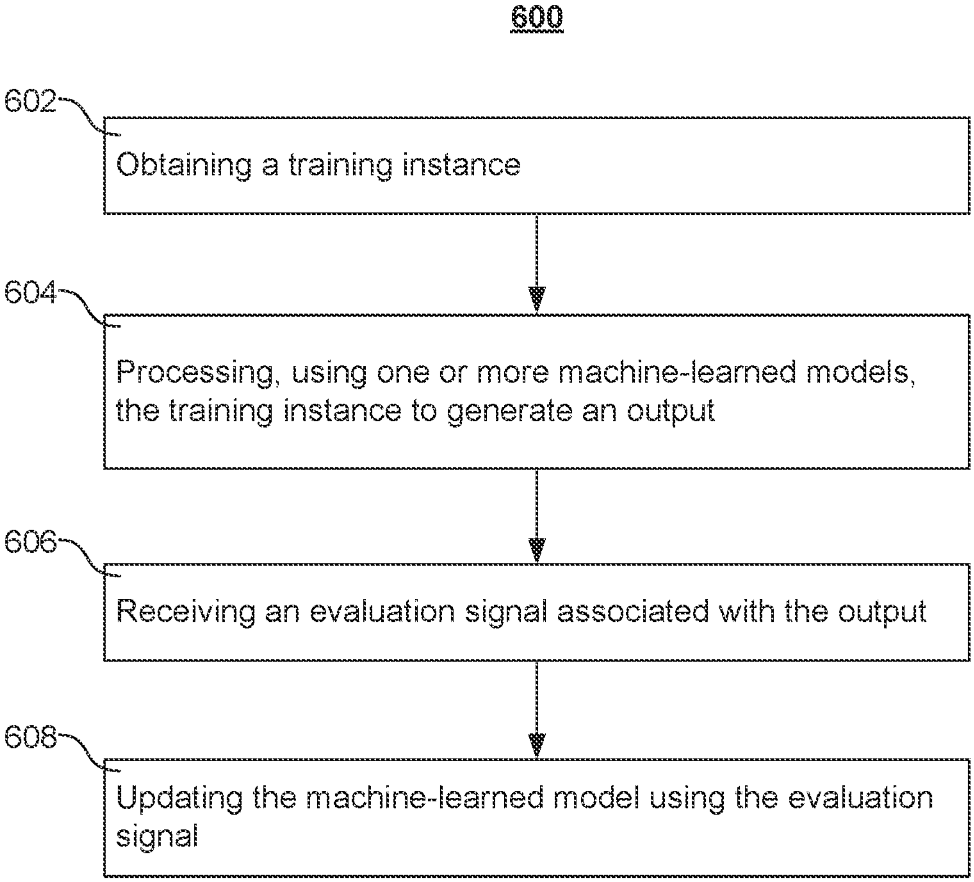
FIG. 6 is a flow chart diagram illustrating an example method for training a machine-learned model according to example implementations of aspects of the present disclosure.

FIG. 6 depicts a flowchart of a method 600 for training one or more machine-learned models according to aspects of the present disclosure. For instance, an example machine-learned model can include a core sequence processing model, such as a foundational large language model (LLM).

At 602, example method 600 can include obtaining a training instance. A set of training data can include a plurality of training instances divided between multiple datasets (e.g., a training dataset, a validation dataset, or testing dataset). A training instance can be labeled or unlabeled. Although referred to in example method 600 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 604, example method 600 can include processing, using one or more machine-learned models, the training instance to generate an output. The output can be directly obtained from the one or more machine-learned models or can be a downstream result of a chain of processing operations that includes an output of the one or more machine-learned models.

At 606, example method 600 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 608, example method 600 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 500 can include implementing a number of generalization techniques (e.g., weight decays, dropouts, etc.) to improve the generalization capability of the models being trained.

In some implementations, example method 600 can be implemented for training a machine-learned model from an initialized state to a fully trained state (e.g., when the model exhibits a desired performance profile, such as based on accuracy, precision, recall, etc.).

In some implementations, example method 600 can be implemented for particular stages of a training procedure. For instance, in some implementations, example method 600 can be implemented for pre-training a machine-learned model. Pre-training can include, for instance, large-scale training over potentially noisy data to achieve a broad base of performance levels across a variety of tasks/data types. In some implementations, example method 600 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Example Machine-Learned Models

Figure 7:
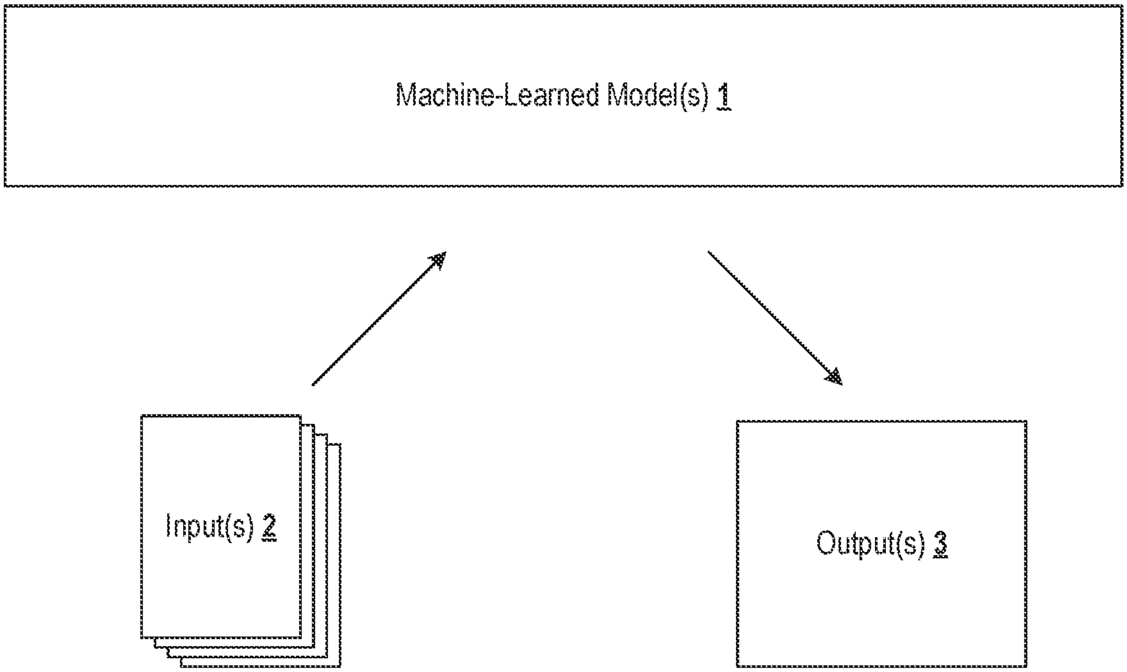
FIG. 7 is a block diagram of an example processing flow for using machine-learned model(s) to process input(s) to generate output(s) according to example embodiments of the present disclosure.

FIG. 7 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism, such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., Mixture-of-Experts with Expert Choice Routing, arXiv: 2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Example Machine-Learned Sequence Processing Models

Figure 8:
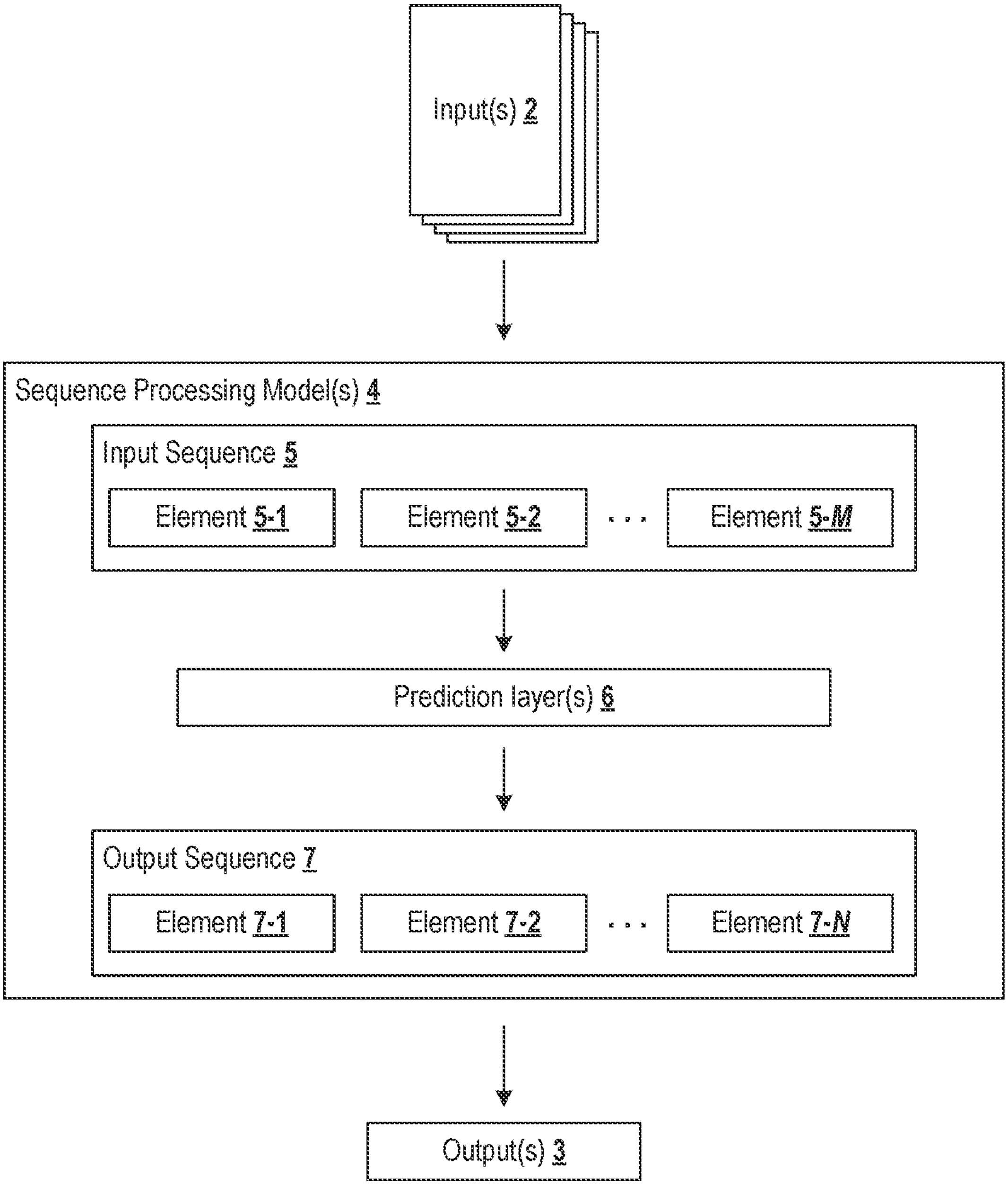
FIG. 8 is a block diagram of an example sequence processing model according to example embodiments of the present disclosure.

FIG. 8 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, ARXIV: 2010.11929v2 (Jun. 3, 2021), audio domains, see, e.g., Agostinelli et al., *MusicLM: Generating Music From Text*, ARXIV: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model (s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 7 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input (s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of _______." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 6. See, e.g., Vaswani et al., *Attention Is All You Need*, arXiv: 1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, arXiv: 2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 9:
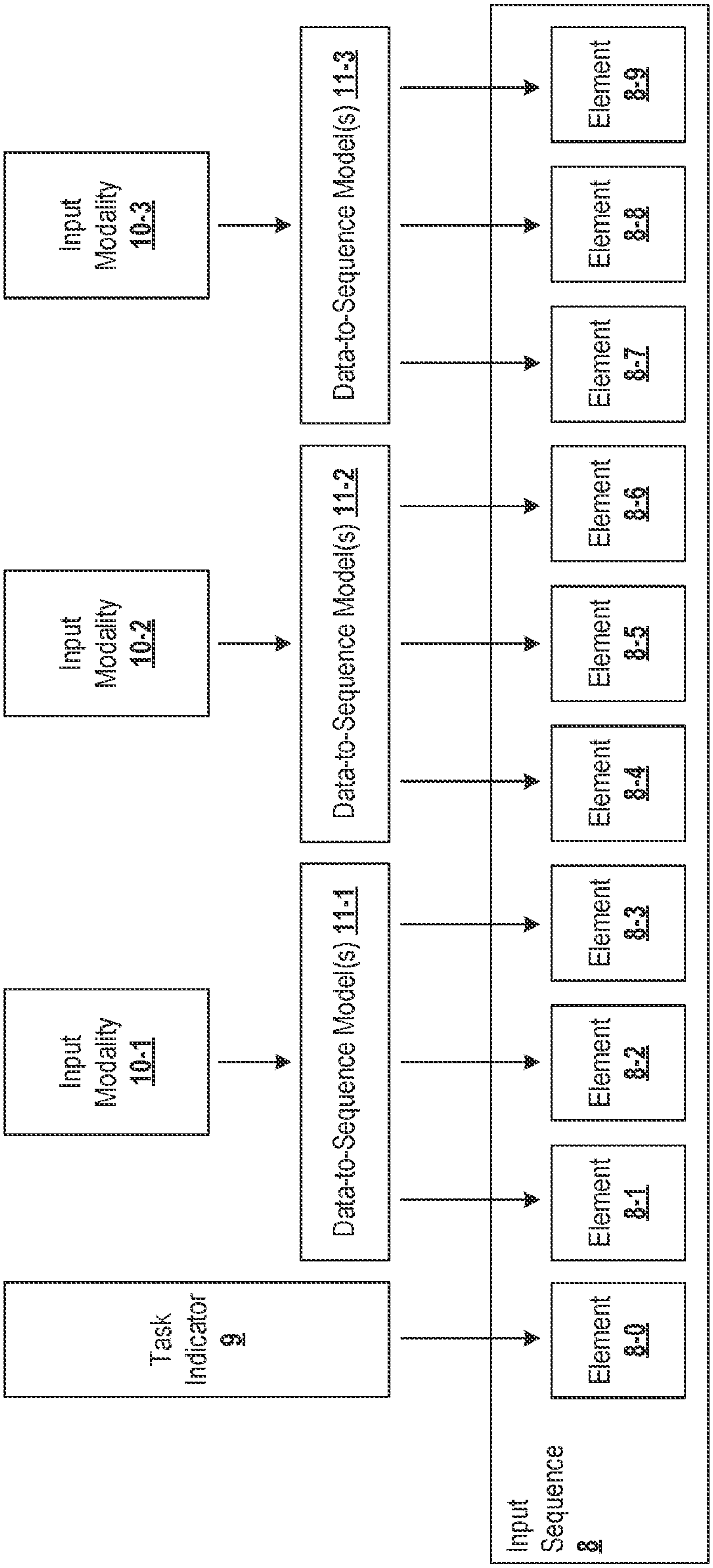
FIG. 9 is a block diagram of an example technique for populating an example input sequence for processing by a sequence processing model according to example embodiments of the present disclosure.

FIG. 9 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be a learned within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Example Machine-Learned Model Development Platform

Figure 10:
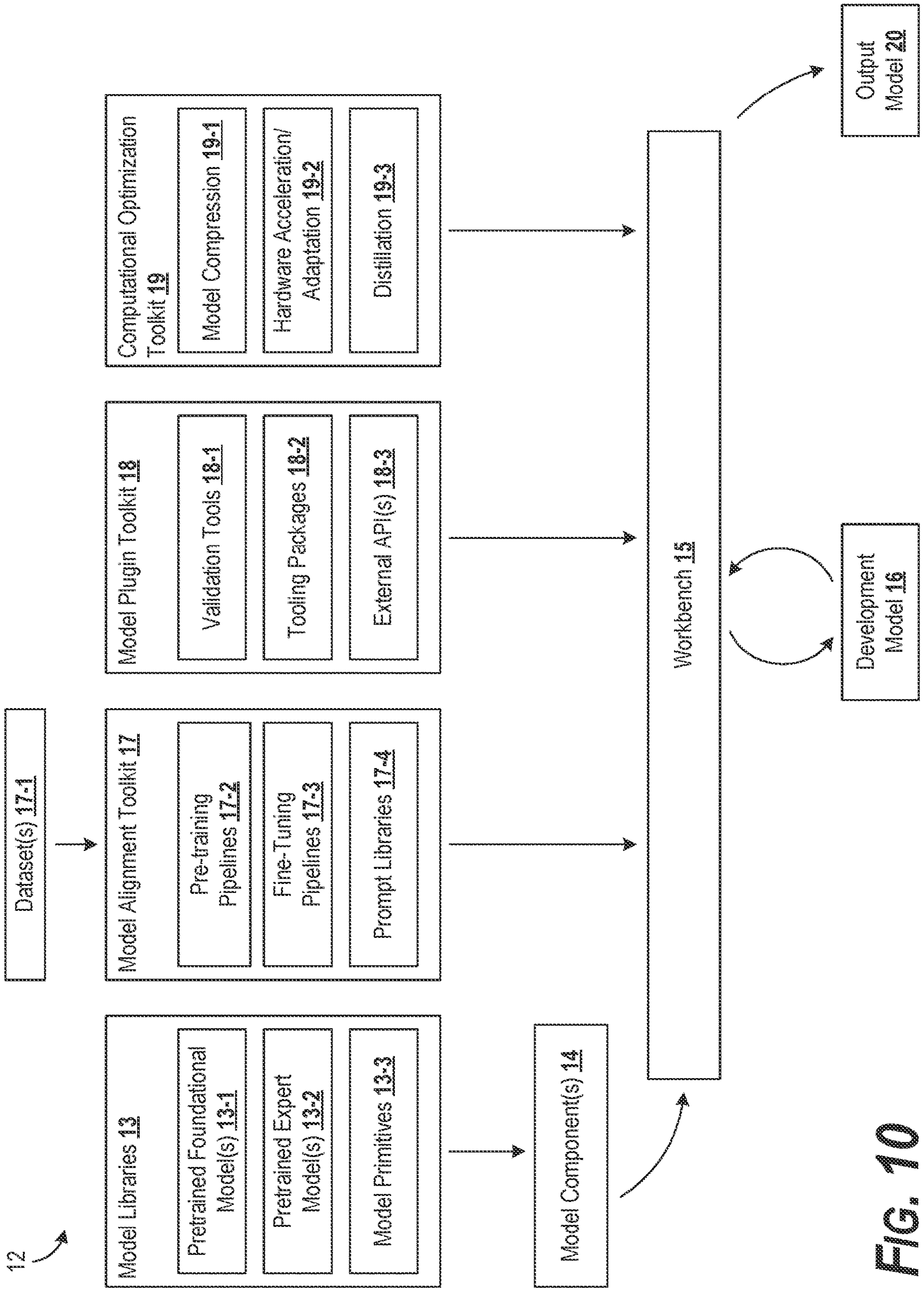
FIG. 10 is a block diagram of an example model development platform according to example embodiments of the present disclosure.

FIG. 10 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output a input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 500 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instruction that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 11:
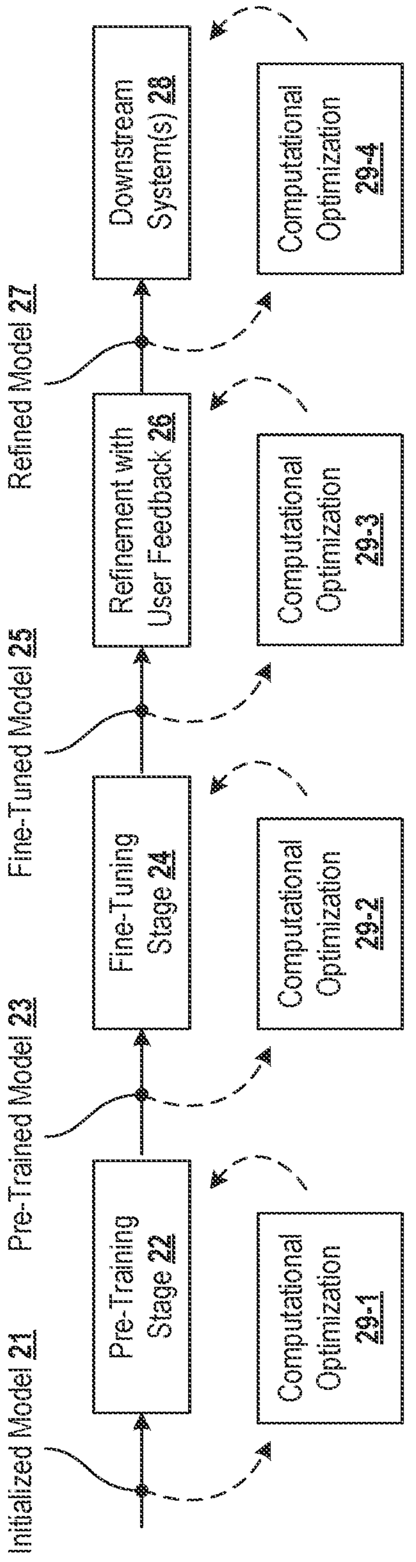
FIG. 11 is a block diagram of an example training workflow for training a machine-learned model according to example embodiments of the present disclosure.

FIG. 11 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model as satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Example Machine-Learned Model Inference System

Figure 12:
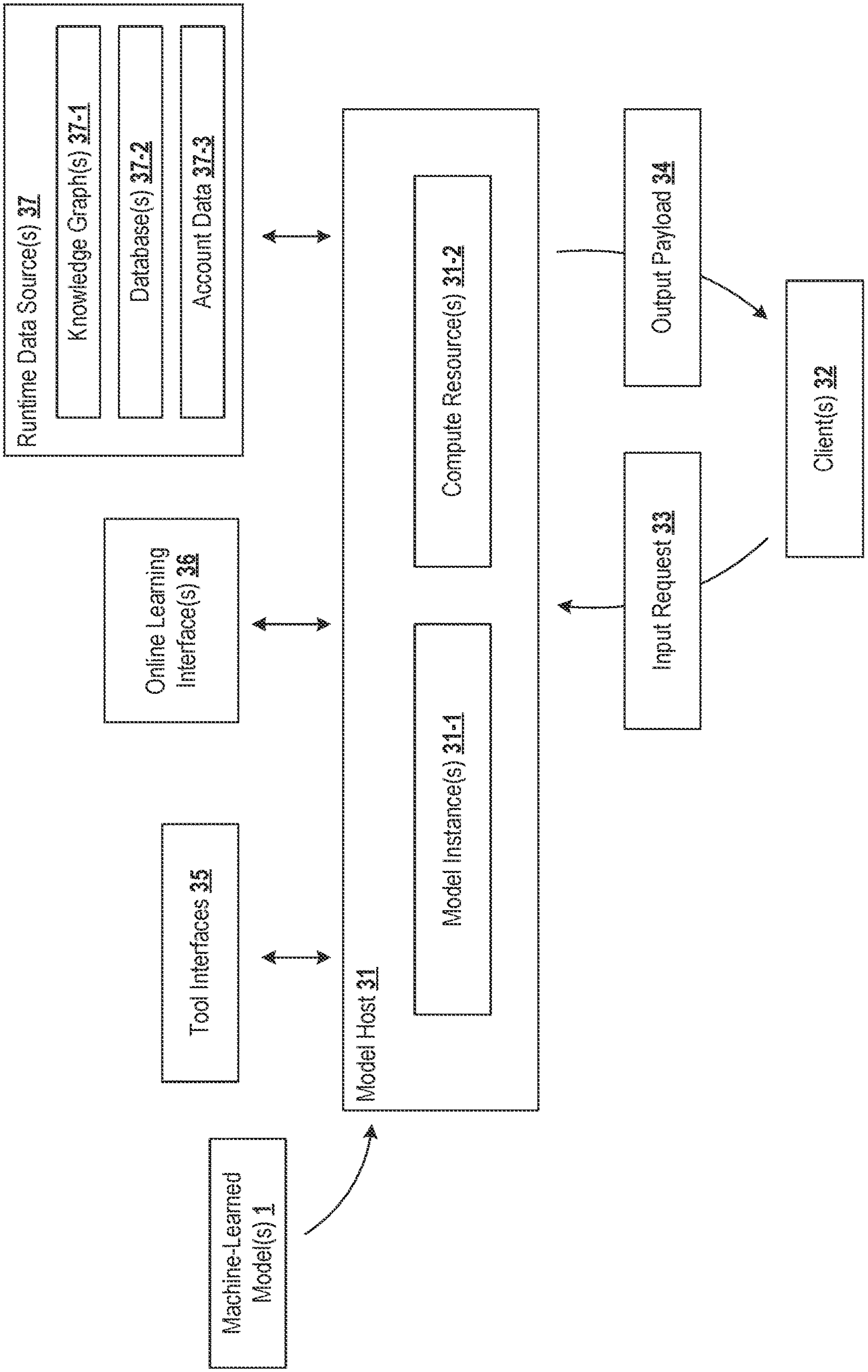
FIG. 12 is a block diagram of an inference system for operating one or more machine-learned model(s) to perform inference according to example embodiments of the present disclosure.

FIG. 12 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored on in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also shard model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model (s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Example Computing Systems and Devices

Figure 13:
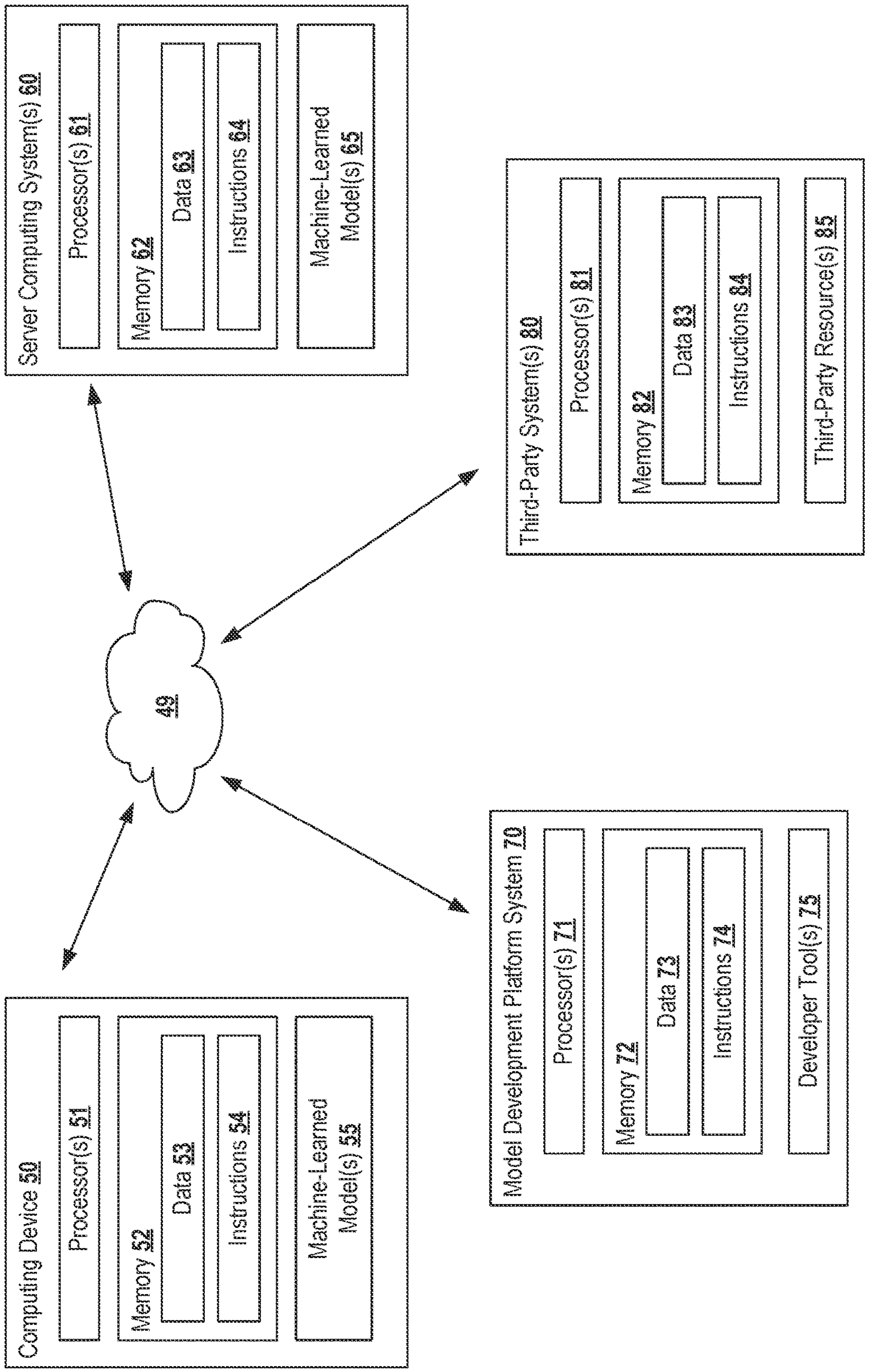
FIG. 13 is a block diagram of an example networked computing system according to example embodiments of the present disclosure.

FIG. 13 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 12 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection.

For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 13 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 14:
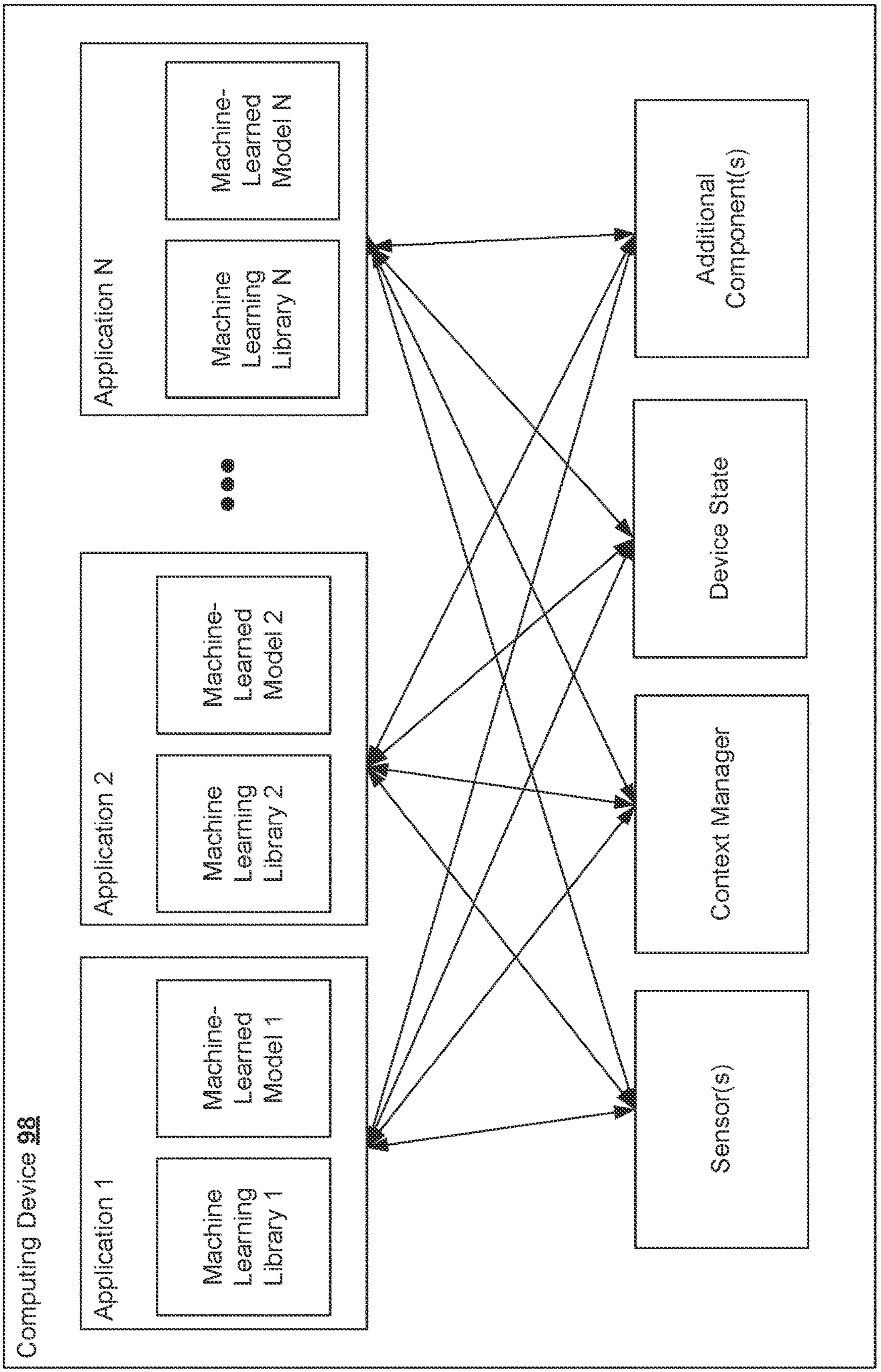
FIG. 14 is a block diagram of an example computing device according to example embodiments of the present disclosure.

FIG. 14 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 14, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 15:
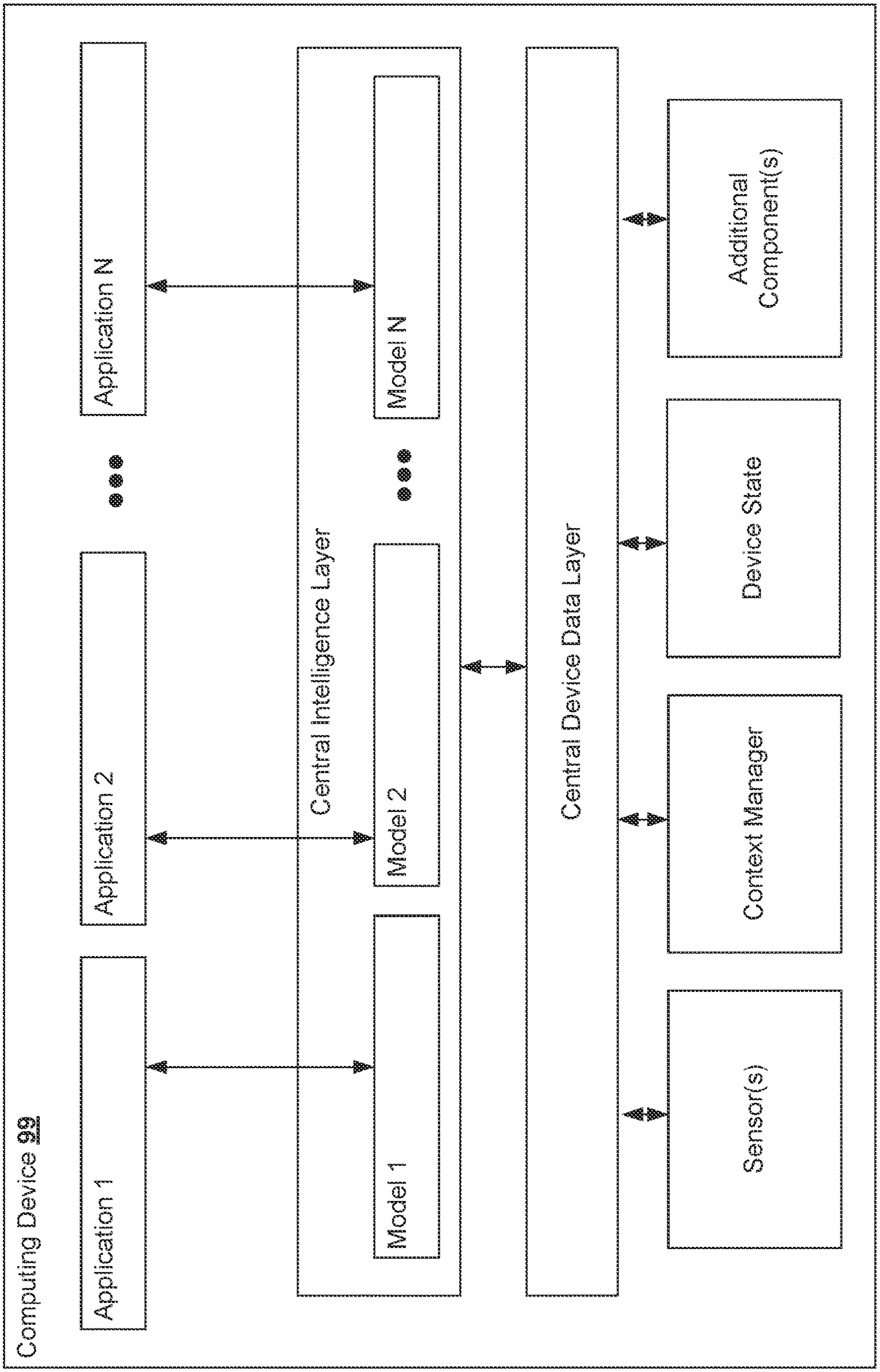
FIG. 15 is a block diagram of an example computing device according to example embodiments of the present disclosure.

FIG. 15 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 15, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 15, the central device data layer can communicate with a number of other components of the computing device, such as, for example, one or more sensors, a context manager, a device state component, or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method for improving efficiency of computing tool retrieval for a sequence processing model, comprising:

for each of a plurality of computing tools, creating, by a computing system, an expanded tool documentation data encoding by encoding, via one or more machine-learned sequence processing models, at least one synthetic query into a multidimensional embedding space based on tool documentation for said each computing tool, wherein the at least one synthetic query represents a potential use case for said each computing tool;

storing, by the computing system in an embedding database, a plurality of embeddings corresponding to the expanded tool documentation data encodings for the plurality of computing tools;

receiving a particular user query;

determining, by the computing system, a subset of the plurality of computing tools that are relevant to the particular user query by comparing an embedding of the particular user query to the plurality of stored embeddings, wherein the subset includes less than all of the plurality of computing tools;

generating, by the computing system, at least one prompt for at least one machine-learned sequence processing model, the at least one prompt including the particular user query and a processing result from each of the subset of the plurality of computing tools in response to the particular user query; and generating, by the computing system, a response to the particular user query based at least in part on an output of the at least one machine-learned sequence processing model in response to the at least one prompt.

2. The computer-implemented method of claim 1, further comprising:

providing, by the computing system to the one or more machine-learned sequence processing models for each of the plurality of computing tools, at least one synthetic query generation request based at least in part on tool documentation associated with said each computing tool; and obtaining, by the computing system from the one or more machine-learned sequence processing models for each computing tool, at least one synthetic query configured for processing by said each computing tool.

3. The computer-implemented method of claim 2, wherein providing, to the one or more machine-learned sequence processing models for each of the plurality of computing tools, the at least one synthetic query generation request comprises:

providing at least one prompt to the one or more machine-learned sequence processing models, the at least one prompt including the tool documentation associated with said each computing tool and a request to generate at least one synthetic query configured for processing by said each computing tool.

4. The computer-implemented method of claim 2, wherein providing, by the computing system to the one or more machine-learned sequence processing models for each of the plurality of computing tools, the at least one synthetic query generation request based at least in part on the tool documentation associated with said each computing tool, comprises:

providing, to the one or more machine-learned sequence processing models for at least one of the plurality of computing tools, a plurality of synthetic query generation requests; and varying a temperature of the one or more machine-learned sequence processing models for at least one of the plurality of synthetic query generation requests.

5. The computer-implemented method of claim 1, wherein storing in the embedding database, the plurality of embeddings corresponding to the expanded tool documentation data encodings for the plurality of computing tools, comprises:

storing tool documentation for said each computing tool with the at least one synthetic query generated by the one or more machine-learned sequence processing models in response to the tool documentation for said each computing tool.

6. The computer-implemented method of claim 1, further comprising:

encoding, into an embedding space, the at least one synthetic query generated by the one or more machine-learned sequence processing models in response to the tool documentation for said each computing tool;

wherein storing in the embedding database, the plurality of embeddings corresponding to the expanded tool documentation data encodings for the plurality of computing tools comprises, storing at least one embedding of the at least one synthetic query.

7. The computer-implemented method of claim 1, wherein:

the one or more machine-learned sequence processing models includes a first sequence processing model; and the at least one machine-learned sequence processing model includes the first sequence processing model.

8. The computer-implemented method of claim 1, wherein determining, by the computing system the subset of the plurality of computing tools that are relevant to the particular user query, comprises:

performing at least one sparse similarity-based retrieval method to compare the particular user query with the plurality of stored embeddings.

9. The computer-implemented method of claim 1, wherein determining, by the computing system the subset of the plurality of computing tools that are relevant to the particular user query, comprises:

performing at least one dense similarity-based retrieval method to compare the particular user query with the plurality of stored embeddings.

10. The computer-implemented method of claim 1, wherein:

the one or more machine-learned sequence processing models include a first large language model.

11. The computer-implemented method of claim 1, wherein:

the at least one machine-learned sequence processing model includes a first large language model.

12. A computer-implemented method for improving efficiency of computing tool retrieval for a sequence processing model, comprising:

providing, by a computing system to one or more machine-learned sequence processing models for each of a plurality of computing tools, at least one synthetic query generation request based at least in part on tool documentation associated with said each computing tool;

obtaining, by the computing system from the one or more machine-learned sequence processing models for each of the plurality of computing tools, at least one synthetic query that is configured for processing by said each computing tool of the plurality of computing tools, wherein the at least one synthetic query represents a potential use case for said each computing tool;

storing, by the computing system in an embedding database, a plurality of embeddings corresponding to an expanded tool documentation data encoding for the plurality of computing tools, the expanded tool documentation data encoding comprising an encoding of the at least one synthetic query into a multidimensional embedding space; and determining, by the computing system, a subset of the plurality of computing tools that are relevant to a particular user query by comparing an embedding of the particular user query to the plurality of stored embeddings, wherein the subset includes less than all of the plurality of computing tools.

13. The computer-implemented method of claim 12, wherein determining, by the computing system, the subset of the plurality of computing tools that are relevant to the particular user query, comprises:

generating, by the computing system, at least one prompt for at least one machine-learned sequence processing model, the at least one prompt including the particular user query and a processing result from each of the subset of the plurality of computing tools in response to the particular user query; and generating, by the computing system, a response to the particular user query based at least in part on an output of the at least one machine-learned sequence processing model in response to the at least one prompt.

14. A computing system, comprising:

one or more processors; and one or more computer-readable storage media that store instructions that, when executed by the one or more processors, cause the one or more processors to perform operations, the operations comprising:

for each of a plurality of computing tools, creating an expanded tool documentation data encoding by encoding, via one or more machine-learned sequence processing models, at least one synthetic query into a multidimensional embedding space based on tool documentation for said each computing tool, wherein the at least one synthetic query represents a potential use case for said each computing tool;

storing in an embedding database, a plurality of embeddings corresponding to the expanded tool documentation encodings for the plurality of computing tools;

receiving a particular user query;

determining a subset of the of the plurality of computing tools that are relevant to the particular user query by comparing an embedding of the particular user query to the plurality of stored embeddings, where the subset includes less than all of the plurality of computing tools;

generating at least one prompt for at least one machine-learned sequence processing model, the at least one prompt including the particular user query and a processing result from each of the subset of the plurality of computing tools in response to the particular user query; and generating a response to the particular user query based at least in part on an output of the at least one machine-learned sequence processing model in response to the at least one prompt.

15. The computing system of claim 14, wherein the operations comprise:

providing, to the one or more machine-learned sequence processing models for each of the plurality of computing tools, at least one synthetic query generation request based at least in part on tool documentation associated with said each computing tool; and obtaining, from the one or more machine-learned sequence processing models for each computing tool, at least one synthetic query configured for processing by said each computing tool.

16. The computing system of claim 15, wherein providing, to the one or more machine-learned sequence processing models for each of the plurality of computing tools, the at least one synthetic query generation request comprises:

providing at least one prompt to the one or more machine-learned sequence processing models, the at least one prompt including the tool documentation associated with said each computing tool and a request to generate at least one synthetic query configured for processing by said each computing tool.

17. The computing system of claim 15, wherein providing, to the one or more machine-learned sequence processing models for each of the plurality of computing tools, the at least one synthetic query generation request based at least in part on the tool documentation associated with said each computing tool, comprises:

providing, to the one or more machine-learned sequence processing models for at least one of the plurality of computing tools, a plurality of synthetic query generation requests; and varying a temperature of the one or more machine-learned sequence processing models for at least two of the plurality of synthetic query generation requests.

18. The computing system of claim 14, wherein storing in the embedding database, the plurality of embeddings corresponding to the expanded tool documentation data encodings for the plurality of computing tools, comprises:

storing tool documentation for said each computing tool with the at least one synthetic query generated by the one or more machine-learned sequence processing models in response to the tool documentation for said each computing tool.

19. The computing system of claim 14, further comprising:

encoding, into an embedding space, the at least one synthetic query generated by the one or more machine-learned sequence processing models in response to the tool documentation for said each computing tool;

wherein storing in the embedding database, the plurality of embeddings corresponding to the expanded tool documentation data encodings for the plurality of computing tools comprises, storing at least one embedding of the at least one synthetic query.

* * * * *